United States Patent
Lo et al.

(10) Patent No.: US 11,055,577 B2
(45) Date of Patent: Jul. 6, 2021

(54) RARE INSTANCE CLASSIFIERS

(71) Applicant: Waymo LLC, Mountain View, CA (US)

(72) Inventors: Wan-Yen Lo, Sunnyvale, CA (US); Abhijit Ogale, Sunnyvale, CA (US); Yang Gao, Berkeley, CA (US)

(73) Assignee: Waymo LLC, Mountain View, CA (US)

( * ) Notice: Subject to any disclaimer, the term of this patent is extended or adjusted under 35 U.S.C. 154(b) by 60 days.

(21) Appl. No.: 16/447,842

(22) Filed: Jun. 20, 2019

(65) Prior Publication Data

US 2019/0318207 A1   Oct. 17, 2019

Related U.S. Application Data

(63) Continuation of application No. 15/630,275, filed on Jun. 22, 2017, now Pat. No. 10,346,724.

(51) Int. Cl.
*G06K 9/62* (2006.01)
*G06N 3/08* (2006.01)
(Continued)

(52) U.S. Cl.
CPC ......... *G06K 9/6267* (2013.01); *G05D 1/0088* (2013.01); *G05D 1/0246* (2013.01);
(Continued)

(58) Field of Classification Search
CPC ........... G06N 3/02–088; G06N 3/0454; G06N 3/084; G06N 3/08; G06K 9/6267;
(Continued)

(56) References Cited

U.S. PATENT DOCUMENTS 10,185,880 B2   1/2019 Viswanathan
10,664,722 B1*  5/2020 Sharma .............. G06Q 30/0641
(Continued)

FOREIGN PATENT DOCUMENTS

| JP | H03-063775 | 3/1991 |
| KR | 1020070034966 | 3/2007 |
| KR | 1020130091366 | 8/2013 |

OTHER PUBLICATIONS

Hendrycks, Dan, and Kevin Gimpel. "A baseline for detecting misclassified and out-of-distribution examples in neural networks." arXiv preprint arXiv:1610.02136v2 (2016). (Year: 2017).*
(Continued)

*Primary Examiner* — Shefali D Goradia
(74) *Attorney, Agent, or Firm* — Fish & Richardson P.C.

(57) ABSTRACT

In some implementations, an image classification system of an autonomous or semi-autonomous vehicle is capable of improving multi-object classification by reducing repeated incorrect classification of objects that are considered rarely occurring objects. The system can include a common instance classifier that is trained to identify and recognize general objects (e.g., commonly occurring objects and rarely occurring objects) as belonging to specified object categories, and a rare instance classifier that is trained to compute one or more rarity scores representing likelihoods that an input image is correctly classified by the common instance classifier. The output of the rare instance classifier can be used to adjust the classification output of the common instance classifier such that the likelihood of input images being incorrectly classified is reduced.

14 Claims, 5 Drawing Sheets

(51) Int. Cl.
  *G06N 3/04* (2006.01)
  *G06K 9/00* (2006.01)
  *G05D 1/02* (2020.01)
  *G05D 1/00* (2006.01)
(52) U.S. Cl.
  CPC ..... *G06K 9/00805* (2013.01); *G06K 9/00818* (2013.01); *G06K 9/6273* (2013.01); *G06N 3/0454* (2013.01); *G06N 3/08* (2013.01); *G06N 3/084* (2013.01)
(58) Field of Classification Search
  CPC ............. G06K 9/6273; G06K 9/00791; G06K 9/00798; G06K 9/00805; G06K 9/00818; G06K 9/00825; G01D 1/0246; G01D 1/0088; B60W 10/10; B60W 60/00276; B60W 2300/00; B60W 2530/213; B60W 2540/041; B60W 2540/049; B60W 2552/00; B60W 2556/65; B60W 2710/00; B60W 2720/406; B60W 2754/00; B60W 2900/00
  USPC .................................................. 382/156–158
  See application file for complete search history.

(56) References Cited

U.S. PATENT DOCUMENTS

| | | |
|---|---|---|
| 2012/0243734 A1 | 9/2012 | Greig |
| 2016/0148079 A1 | 5/2016 | Shen |
| 2017/0039456 A1 | 2/2017 | Saberian et al. |
| 2017/0053211 A1 | 2/2017 | Heo et al. |
| 2017/0061326 A1 | 3/2017 | Talathi et al. |
| 2018/0373963 A1 | 12/2018 | Lo |

OTHER PUBLICATIONS

"Logistic Regression." ML Cheat Sheet, ml-cheatsheet.readthedocs.io/en/latest/logistic_regression.html (2017). (Year: 2017).*

Baluja, Shumeet, Michele Covell, and Rahul Sukthankar. "The virtues of peer pressure: A simple method for discovering high-value mistakes." International Conference on Computer Analysis of Images and Patterns. Springer, Cham, 2015. (Year: 2015).*

Paterson, Colin, and Radu Calinescu. "Detection and mitigation of rare subclasses in neural network classifiers." arXiv preprint arXiv:1911.12780 (2019). (Year: 2019).*

PCT International Preliminary Report on Patentability in International Appln. No. PCT/US2018/038318, dated Dec. 24, 2019, 10 pages.

SG Office Action in Singapore Appln. No. 11201912665R, dated Sep. 14, 2020, 8 pages.

AU Office Action in Australian Appln. No. 2018288720, dated Jul. 24, 2020, 4 pages.

Baluja, Shunneet, Michele Covell, and Rahul Sukthankar. The virtues of peer pressure: A simple method for discovering high-value mistakes. International Conference on Computer Analysis of Images and Patterns. Springer, Cham, 2015. (Year: 2015).

Huang, Chen, et al. "Learning Deep Representation for Innbalanced Classification." Computervision and Pattern Recognition (CVPR), 2016 IEEE Conference on. IEEE, 2016. (Year: 2016).

Khor, Kok-Chin, Choo-Yee Ting, and Sonnnuk Phon-Annnuaisuk. "A cascaded classifier approach for improving detection rates on rare attack categories in network intrusion detection." Applied Intelligence 36.2 (2012): 320-329. (Year: 2012).

PCT International Search Report and Written Opinion issued in International Application No. PCT/US2018/038318, dated Oct. 1, 2018, 15 pages.

Wang, Shoujin, et al. "Training deep neural networks on imbalanced data sets." Neural Networks (IJCNN), 2016 International Joint Conference on. IEEE, 2016. (Year: 2016).

JP Office Action in Japanese Appln. No. 2019-570802, dated Apr. 2, 2021, 9 pages (with English translation).

AU Office Action in Australian Appln. No. 2018288720, dated Feb. 15, 2021, 4 pages.

CA Office Action in Canadian Appln. No. 3,068,258, dated Feb. 11, 2021, 3 pages.

KR Office Action in Korean Appln. No. 10-2020-7002036, dated Jan. 26, 2021, 11 pages (with English translation).

* cited by examiner

RARE INSTANCE CLASSIFIERS

CROSS-REFERENCE TO RELATED APPLICATION

This is a continuation of U.S. application Ser. No. 15/630,275, filed on Jun. 22, 2017, the disclosure of which is considered part of and is incorporated by reference in the disclosure of this application.

FIELD

This specification relates to autonomous vehicles.

BACKGROUND

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more filters, which are defined by parameters of the layer. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Generally, convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use object detection predictions for making driving decisions.

Autonomous vehicle systems can make object detection predictions using human-programmed logic. The human-programmed logic specifies precisely how the outputs of on-board sensors should be combined, transformed, and weighted, in order to compute a full-object prediction.

SUMMARY

In some implementations, an image classification system of an autonomous or semi-autonomous vehicle is capable of improving multi-object classification by reducing repeated incorrect classification of objects that are considered rarely occurring objects. The system can include a common instance classifier that is trained to identify and recognize general objects (e.g., commonly occurring objects and rarely occurring objects) as belonging to specified object categories, and a rare instance classifier that is trained to compute one or more rarity scores representing likelihoods that an input image is correctly classified by the common instance classifier. The output of the rare instance classifier can be used to adjust the classification output of the common instance classifier such that the likelihood of input images being incorrectly classified is reduced.

Particular embodiments of the subject matter described in this specification can be implemented so as to realize one or more of the following advantages. An autonomous or semi-autonomous vehicle system can use a fully-trained classifier subsystem to quickly reduce repeated errors for rarely occurring objects without re-training the classifier. The system can use techniques to improve the accuracy of classifications of images as including certain objects. The system can also process input images through specific classifier subsystems to reduce computational resources required to generate accurate object predictions.

In addition, the system can apply the common instance and rare instance classifiers in parallel to improve image classification performance of misclassified rarely occurring objects. For example, determination of a high likelihood that an image includes an image of a rare object or another kind of object that is frequently misclassified by a common instance classifier can be used as negative feedback to reduce a false positive classification of the image by an image classification system.

The system can further be applied to process data from different kinds of sensors, e.g., LIDAR, and video cameras, and can combine the data from different sensors to improve overall image classification performance.

In one general aspect, a method includes receiving an input image; processing the input image using a common instance neural network, where the common instance neural network is configured to process the input image to generate a common instance output including a respective first object score corresponding to each of one or more first object categories, each first object score representing a likelihood that the input image includes an image of an object belonging to the corresponding first object category; processing the input image using a rare instance neural network, where the rare instance neural network is configured to process the input image to generate a rare instance output including a rarity score that represents a likelihood that the input image will be incorrectly classified by the common instance neural network; determining a weight to be assigned to the one or more respective first object scores in classifying the input image using the rarity score; and classifying the input image in accordance with the determined weight.

One or more implementations may include the following optional features. For example, in some implementations, the rare instance neural network has been trained on training images that were misclassified by the common instance neural network.

In some implementations, the rare instance neural network has been trained on images of object types that occur rarely in images used to train the common instance neural network.

In some implementations, the rare instance output further includes a respective second object score corresponding to each of one or more second object categories, each second object score representing a likelihood that the input image includes an image of an object belonging to the corresponding second object category; and the method further includes the operation of determining a weight to assign the one or more second object scores in classifying the input image using the rarity score.

In some implementations, the second object categories include one or more of the first object categories.

In some implementations, determining a weight to assign the one or more second object scores include using the rarity score as the weight for the second object scores.

In some implementations, determining a weight to assign the one or more second object scores and the one or more first object scores includes: determining that the rarity score does not satisfy a predetermined threshold, and in response, reducing the weight assigned to the one or more respective second object scores in classifying the input image.

In some implementations, determining a weight to assign the one or more second object scores and the one or more first object scores includes: determining that the rarity score satisfies a predetermined threshold, and in response determining that the rarity score satisfies a predetermined threshold, reducing the weight assigned to the one or more respective first object scores in classifying the input image.

In some implementations, reducing the weight assigned to the one or more respective first object scores include assigning a weight to a value that indicates that the first object scores are not used in classifying the input image.

In some implementations, classifying the input image includes: processing the common instance output and the rare instance output using a combining neural network, where the combing neural network configured to compute a respective third object score corresponding to each of the one or more first object categories, each third object score computed based on the determined weights assigned to the one or more respective first object scores and the determined weights assigned to the one or more respective second object scores; and classifying the input image based on the respective values of the third object scores.

In some implementations, determining the weight to assign the one or more respective first object scores include: determining that the rarity score satisfies a predetermined threshold; and in response to determining that a rarity score satisfies a predetermined threshold, reducing the weight assigned to the one or more respective first object scores in classifying the input image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use one or more fully-learned classifiers to improve classification of objects detected by sensors of the vehicle by reducing repeated incorrect classification of images that include objects that are determined to be rarely occurring objects or other images that are frequently misclassified by a common instance classifier. For example, rarely occurring objects can include objects that rarely occur in training data used to train the common instance classifier. In other examples, rarely occurring objects can include objects that are rarely classified as being included in certain object categories in an environment surrounding the vehicle. Each object category can specify a type of object that may occur within a vicinity of the vehicle as it travels. For example, object categories can represent signs, pedestrians, cyclists, or other vehicles within a proximity to the vehicle.

As used in throughout this description, a "fully-learned" machine learning model is a model that is trained to compute a desired prediction. In other words, a fully-learned model generates an output based solely on being trained on training data rather than on human-programmed decisions.

Figure 1:
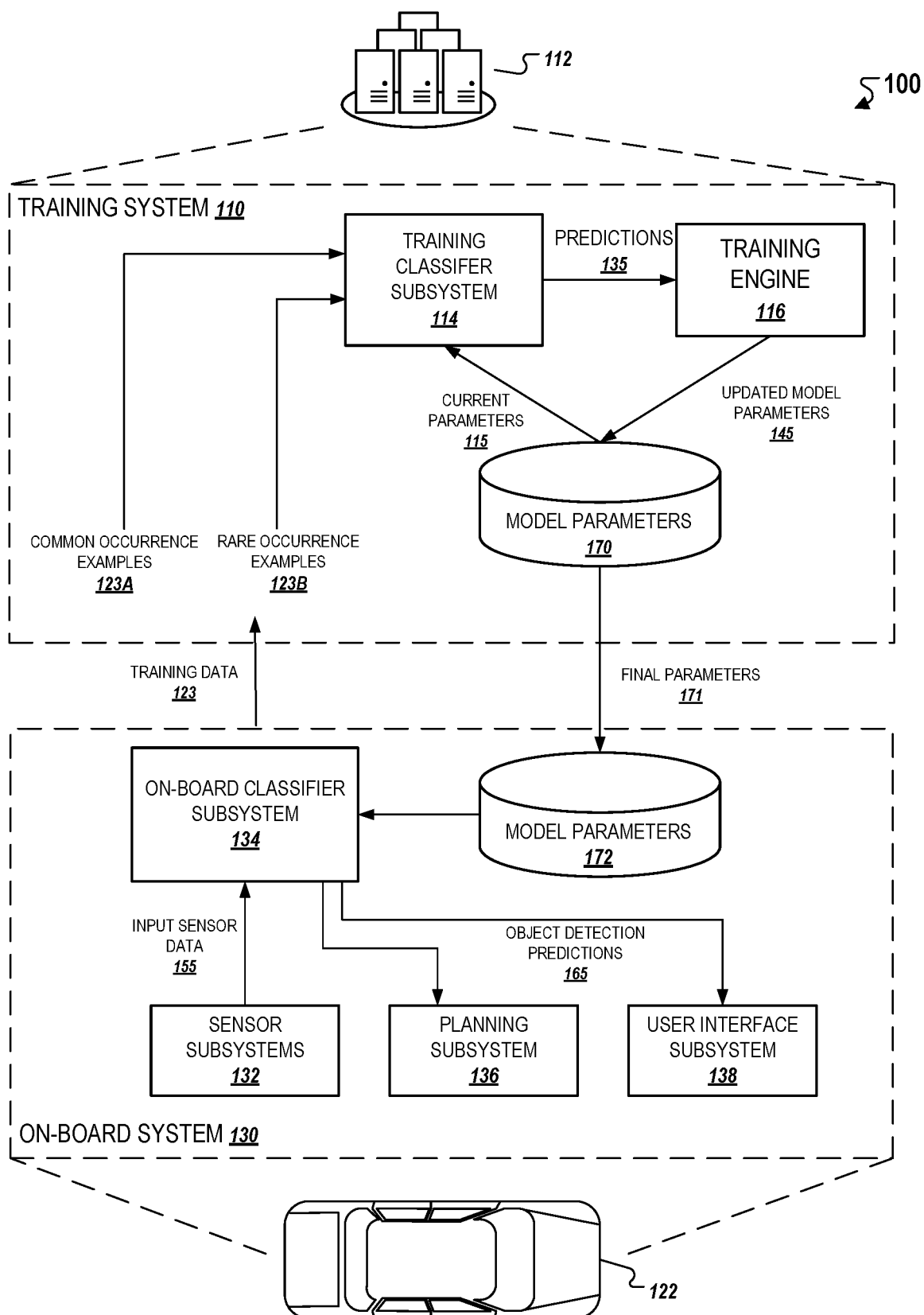
FIG. 1 is a block diagram of an example of a system.

FIG. 1 is a diagram of an example system 100. The system 100 includes a training system 110 and an on-board system 130.

The on-board system 130 is physically located on-board a vehicle 122. The vehicle 122 in FIG. 1 is illustrated as an automobile, but the on-board system 130 can be located on-board any appropriate vehicle type. The vehicle 122 can be a fully autonomous vehicle that uses object detection predictions to inform fully-autonomous driving decisions. The vehicle 122 can also be a semi-autonomous vehicle that uses image classification predictions to aid a human driver. For example, the vehicle 122 can autonomously apply the brakes if a full-object prediction indicates that a human driver is about to collide with a detected object, e.g., a pedestrian, a cyclist, another vehicle.

The on-board system 130 includes one or more sensor subsystems 132. The sensor subsystems include a combination of components that receive reflections of electromagnetic radiation, e.g., LIDAR systems that detect reflections of laser light, radar systems that detect reflections of radio waves, and camera systems that detect reflections of visible light.

The sensor subsystems can also include combinations of short-range and long-range laser sensors. For example, a short-range laser sensor can be used to detect the ground surrounding vehicle 122 and nearby objects within 40 meters from the vehicle 122. In another example, a long-range laser sensor can be used to detect objects up to 200 meters around the vehicle 122.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 provide input sensor data 155 to an on-board classifier subsystem 134. The input sensor data 155 can include multiple channels of data, where each channel represents a different characteristic of reflected electromagnetic radiation. Thus, multiple channels of input sensor data 155 can be generated from measurements from the same sensor. For example, the input sensor data 155 can include images captured by a camera of an environment that surrounds a vehicle.

The sensor subsystems 132, the on-board classifier subsystem 134, or some combination of both, transform raw sensor data into the multiple channels of input sensor data 155. To do so, the on-board system 130 can project the various characteristics of the raw sensor data into a common coordinate system.

Figure 3A:
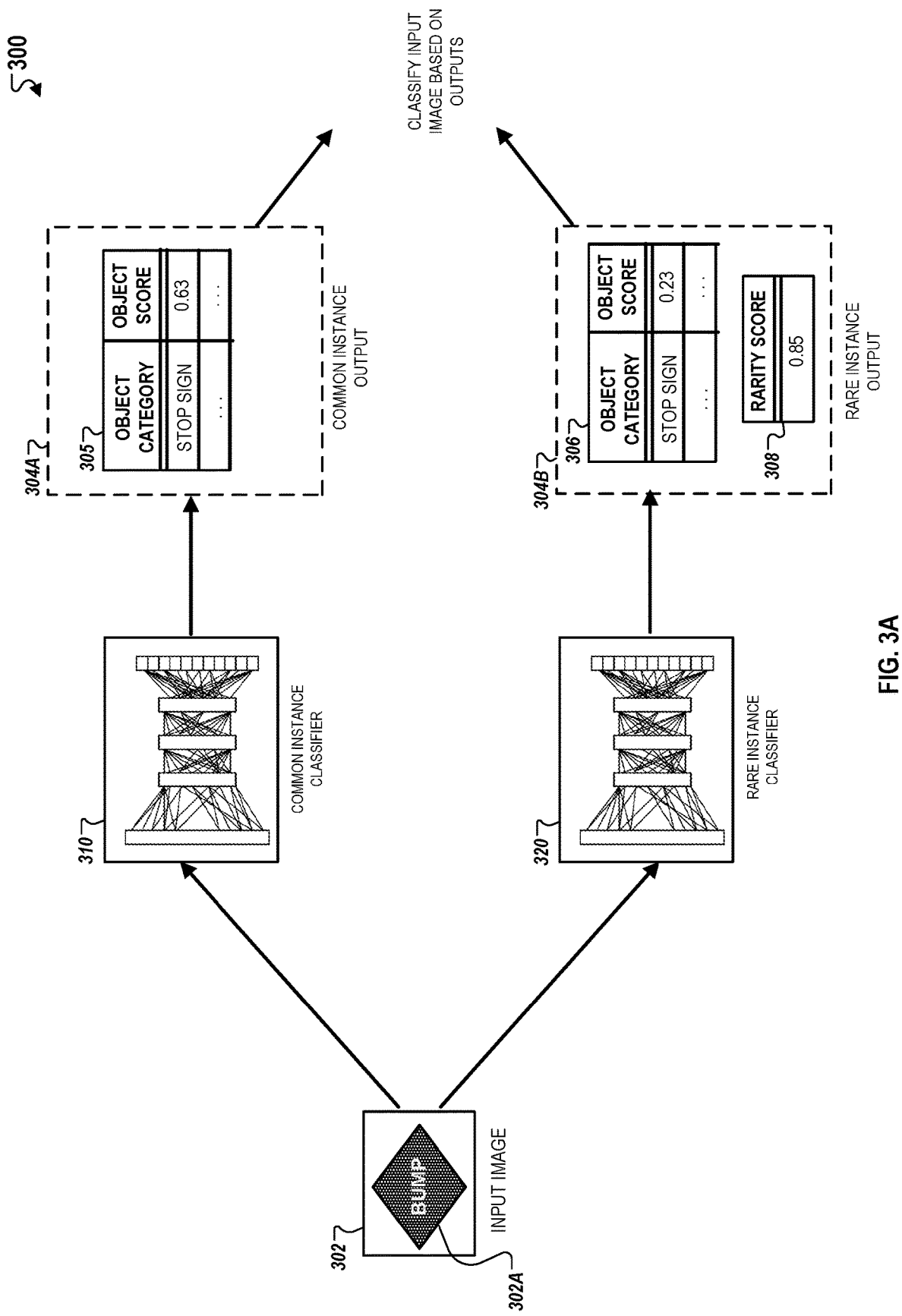
FIG. 3A is a schematic diagram of an example of an architecture that includes a common instance classifier and a rare instance classifier.
Figure 3B:
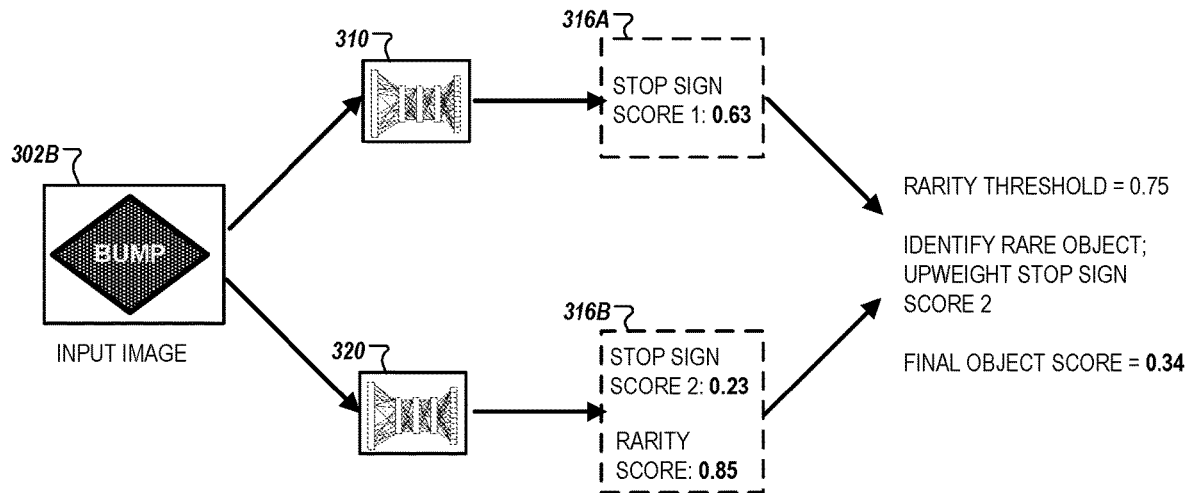
FIG. 3B is a schematic diagram of an example of an architecture where a rare instance classifier identifies a rarely occurring object within an input image.
Figure 4:
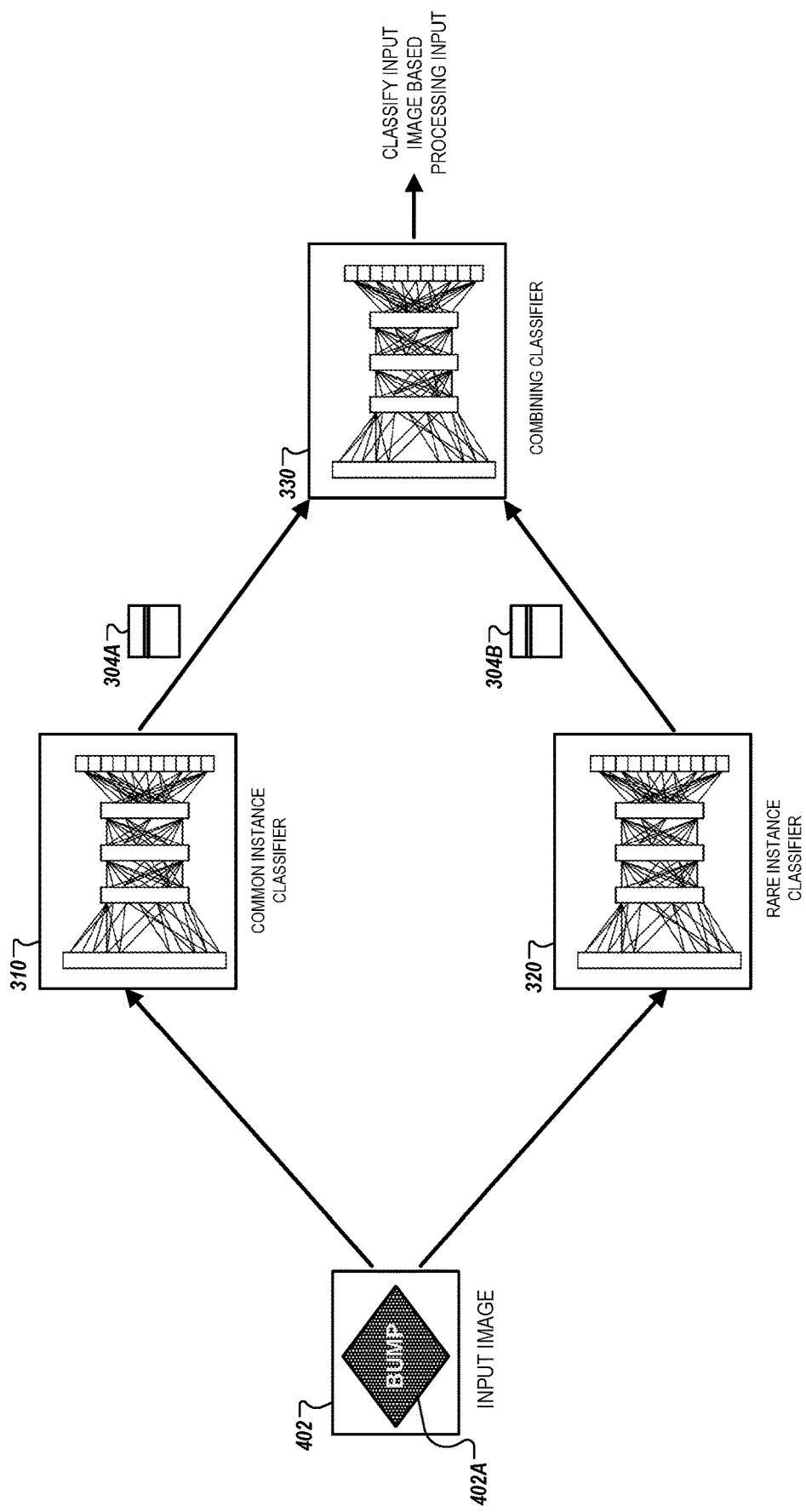
FIG. 4 is a schematic diagram of an example of an architecture that includes a combining neural network that processes the outputs of a common instance classifier and a rare instance classifier.

The on-board classifier subsystem 134 implements the operations of a set of classifiers that are trained to make predictions related to image classification, i.e., related to classifying images of an environment surrounding the vehicle as including objects from one or more object categories. The on-board classifier subsystem 134 includes a fully-trained common instance classifier 310 and a fully-trained rare instance classifier 320, which are depicted in FIGS. 3A, 3B and 4. As shown in FIG. 3A, the common and rare instance classifiers 310 and 320 can be applied in parallel to process an input image 302 within the input sensor data 155 to improve the accuracy of image classification. For example, the rare instance classifier 320 computes a rarity score that represents a likelihood that the input image 302 includes an object of a type that is likely to be misclassified by the common instance classifier 310, e.g., a rarely occurring object. The rarity score can be used to adjust classification of the input image 302 to reduce the likelihood of misrecognizing the input image 302 as described in detail below.

The on-board classifier subsystem 134 can implement the operations of a classifier by loading a collection of model parameters 172 that are received from the training system 110. Although illustrated as being logically separated, the model parameters 170 and the software or hardware modules performing the operations may actually be located on the same computing device or, in the case of an executing software module, stored within the same memory device.

The on-board classifier subsystem 134 can use hardware acceleration or other special-purpose computing devices to implement the operations of the classifier. For example, some operations of some layers may be performed by highly parallelized hardware, e.g., by a graphics processing unit or of another kind of specialized computing device. In other words, not all operations of each layer need to be performed by central processing units (CPUs) of the on-board classifier subsystem 134.

The on-board classifier subsystem 134 uses the input sensor data 155 to generate one or more image classification predictions 165. The on-board classifier subsystem 134 can provide the one or more image classification predictions 165 to a planning subsystem 136, a user interface subsystem 138, or both.

When a planning subsystem 136 receives the one or more image classification predictions 165, the planning subsystem 136 can use the one or more image classification predictions 165 to make fully-autonomous or semi-autonomous driving decisions. For example, the planning subsystem 136 can generate a fully-autonomous plan to navigate through or around other vehicles on a highway while also avoiding cyclists and pedestrians. As another example, the planning subsystem 136 can generate a semi-autonomous recommendation for a human driver to apply the brakes.

A user interface subsystem 138 can receive the image classification predictions 165 or the results of post-processing of the image classification predictions 165 by another component and can generate a user interface presentation that indicates the locations of nearby objects. For example, the user interface subsystem 138 can generate a user interface presentation having image or video data containing a representation of the regions of space that are likely to be occupied by objects. An on-board display device can then display the user interface presentation for passengers of the vehicle 122.

The on-board classifier subsystem 134 can also use the input sensor data 155 to generate training data 123. The training data 123 can include the projected representations of the different channels of input sensor data. The on-board system 130 can provide the training data 123 to the training system 110 in offline batches or in an online fashion, e.g., continually whenever it is generated. As depicted, the training data 123 includes training examples 123A and 123B representing images of commonly occurring and rarely occurring objects, respectively. During a training operation, training examples 123A are used to train the common instance classifier 310 and training examples 123B are used to train the rare instance classifier 320.

In some implementations, the training examples 123B include images that were included in the training examples 123A and used for training the common instance classifier 310 but were misclassified by the common instance classifier 310 after the common instance classifier 310 was trained. A misclassified image is an image for which the trained common instance classifier 310 generated a classification output that indicates that the image includes an object from a different category, or no category, then is indicated by a known label for the image.

The images that were misclassified by the common instance classifier 310 can then be used to train the rare instance classifier 320. In some implementations, the misclassified images that are included in the training examples 123B can be modified using image processing techniques to introduce new poses, perspectives, etc. In such implementations, the training examples 123B includes the original misclassified images and the processed versions of the misclassified images.

In other words, the training data 123 includes multiple segments that are each used to train a different classifier that is used to classify images of an environment surrounding the vehicle as including objects from one or more object categories. For example, a training segment that includes the training examples 123A and 123B can be used to train a common instance classifier, and another training segment that only includes the training examples 123B can be used to train a rare instance classifier.

The training system 110 is typically hosted within a data center 112, which can be a distributed computing system having hundreds or thousands of computers in one or more locations.

The training system 110 includes a training classifier subsystem 114 that can implement the operations of the classifier that is designed to make image classification predictions from input sensor data. The training classifier subsystem 114 includes a plurality of computing devices having software or hardware modules that implement the respective operations of the classifier according to an architecture of the classifier.

The training classifiers generally have the same architecture as the on-board classifiers. However, the training system 110 need not use the same hardware to compute the operations of each layer. In other words, the training system 110 can use CPUs only, highly parallelized hardware, or some combination of these.

The training classifier subsystem 114 can compute the operations of each layer of the classifier using current values of parameters 115 stored in a collection of model parameters 170. Although illustrated as being logically separated, the model parameters 170 and the software or hardware modules performing the operations may actually be located on the same computing device or on the same memory device.

The classifier subsystem 114 can receive training examples 123A and 123B as input. The training examples 123A and 123B can generally include auto-labeled training data, human-labeled training data, or some combination of the two. Each of the training examples 123A and 123B includes images of reference objects as well as one or more labels for each image. Each label identifies a correct classification for the image, i.e., identifies one or more object categories to which one or more objects pictured in the image belong.

The training examples 123A can include images of reference objects that are predetermined to be associated with different object categories, e.g., signs, pedestrians, that are commonly detected in an environment near a vicinity of a vehicle. Examples of commonly occurring objects include stop signs, hazard signs, and traffic lights.

The training examples 123B can include images of reference objects that are predetermined to be associated with different object categories that are not commonly detected (e.g., rarely detected) in an environment near a vicinity of a vehicle. Examples of rarely occurring objects include location-specific traffic signs, advertising billboards for small companies, or distorted representations of commonly occurring objects. In some implementations, training examples 123A and 123B include images of different objects that belong to the same category, e.g., a bicycle and a car for the "vehicle" object category.

The training classifier subsystem 114 can generate, for each training example 123, one or more image classification predictions 135. A training engine 116 analyzes the image classification predictions 135 and compares the image classification predictions to the labels in the training examples 123. The training engine 116 then generates updated model parameter values 145 by using an appropriate training technique, e.g., backpropagation. The training engine 116 can then update the collection of model parameters 170 using the updated model parameter values 145.

After training is complete, the training system 110 can provide, e.g., by a wired or wireless connection, a final set of model parameter values 171 to the on-board system 130 for use in making fully autonomous or semi-autonomous driving decisions.

Figure 2:
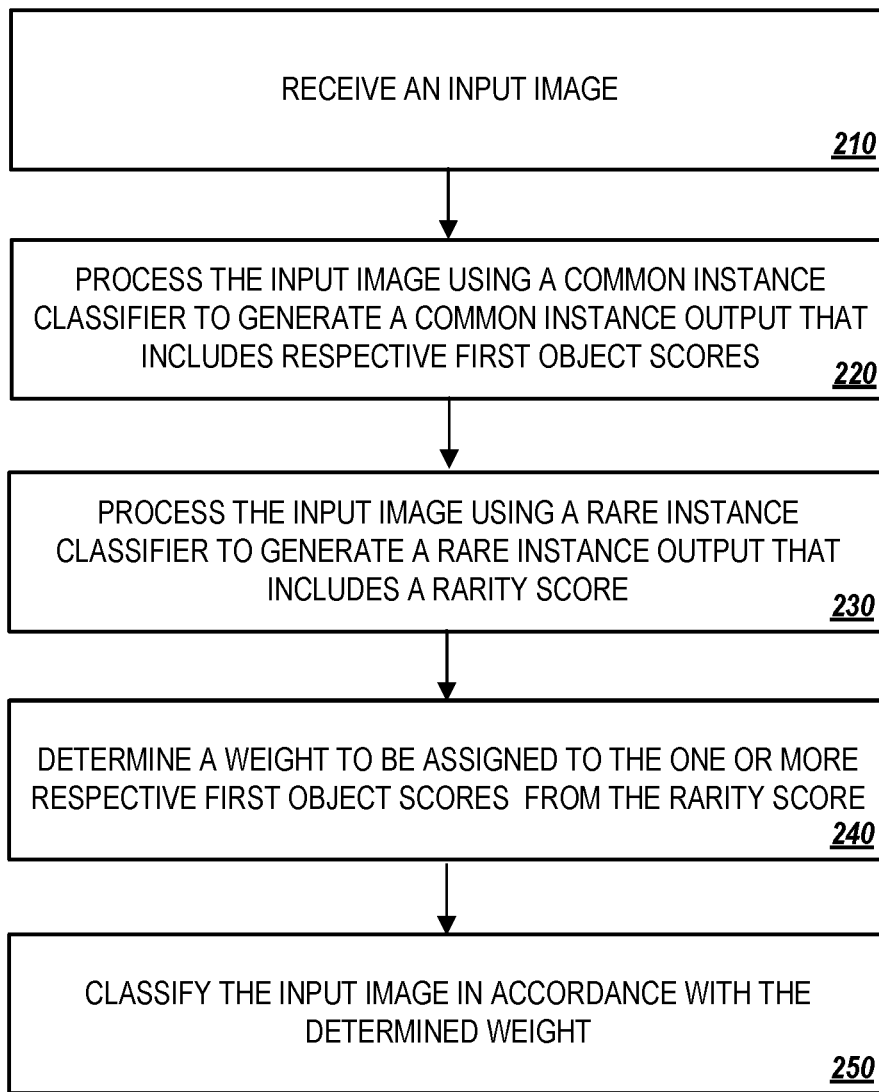
FIG. 2 is a flow chart of an example of a process for classifying images of an environment surrounding an autonomous vehicle.

FIG. 2 is a flow chart of an example of a process 200 for classifying images of an environment surrounding an autonomous vehicle. For convenience, the process 200 will be described as being performed by a system of one or more computers located in one or more locations. For example, a classifier system, e.g., the on-board system 130 of FIG. 1, appropriately programmed in accordance with this specification, can perform the process 200.

In general, the classifier system performs the image classification techniques described throughout using a parallel network architecture depicted in more detail in FIG. 3A, which is a schematic diagram of an example of an architecture 300A that includes a common instance classifier 310 and a rare instance classifier 320. The common instance classifier 310 and the rare instance classifier 320 each process an input image 320 as depicted in FIG. 3A and described in detail below.

Briefly, the process 200 can include receiving an input image (210), processing the input image using a common instance classifier to generate a common instance output that includes respective first object scores (220), processing the input image using a rare instance classifier to generate a rare instance output that includes an rarity score (230), determining a weight to be assigned to the one or more respective first object scores (240), and classifying the input image in accordance with the determined weight (250).

In more detail, the system receives an input image (210). The input image 302 is an image of an environment surrounding an autonomous vehicle. The input image 302 can be captured by an onboard sensor of the vehicle such as the sensor subsystem 132 and included within the input sensor data 155.

The system processes the input image using a common instance classifier to generate a common instance output that includes one or more first object scores (220). For instance, the common instance classifier 310 processes the input image 302 to generate a common instance output 304A. For example, the common instance classifier 310 processes the input image 302 using image classification techniques to compute one or more first object scores for the input image 302, which is included in the common instance output 304A. Each first object score can represent a likelihood that the image includes an image of an object that belongs to a corresponding object category. In some implementations, the common instance output 304A includes multiple object scores that each correspond to a different object category. The system processes the input image using a rare instance classifier to generate a rare instance output that includes a rarity score (230). For instance, the rare instance classifier 320 processes the input image 302 to generate a rare instance output 304B. The rarity score represents a likelihood that the input image 302 will be misclassified by the first classifier, e.g., because the image 302 includes an image of a rarely occurring object. For example, rarely occurring objects can include objects that are rarely occur in training data used to train the common instance classifier. In other examples, a rarely occurring object can be an object that has a different appearance than a commonly occurring object, and is therefore likely to be misclassified by a classified, e.g., a stop sign with small "STOP" text compared to other commonly occurring stop signs.

In some implementations, the rare instance output 304B additionally includes one or more second object scores. As described above with respect to the common instance output 304A, each second object score can represent a likelihood that the image includes an image of an object that belongs to a corresponding object category. The rare instance output 304B, in some instances, can include multiple object scores that each correspond to different object categories.

The common and rare instance outputs 304A and 304B can include object scores that are computed for the same object categories. For example, the common and rare instance outputs 304A and 304B can include object scores computed for "stop sign" and "pedestrian" object categories. In this example, the first and second object scores described above represent scores that are computed by the common and rare instance classifiers 310 and 320, respectively, for the same object categories.

Alternatively, the common and rare instance outputs 304A and 304B include object scores that are computed for different object categories. For example, the common instance output 304A can include an object score computed for a "stop sign" object category whereas the rare instance output 304B can include an object score computed for a "green stop sign" or "octagonal yield sign" category.

The system determines a weight to be assigned to the one or more respective first object scores from the rarity score (240). For instance, the system uses the rarity score to determine a weight to be assigned to the object scores included within the common instance output 304A and the rare instance output 304B.

In some implementations, the system compares the rarity score to a predetermined threshold and in response to determining that the rarity score satisfies the predetermined threshold, the system determines that the input image 302 has likely been misclassified by the common instance classifier, e.g., an image of a rarely-occurring object. In such implementations, the system adjusts the object scores within the common instance output 310 based on determining that an object within the input image 302 has likely been misclassified. For example, the object scores computed by the common instance classifier 310 can be reduced. In some implementations, the system uses the rarity score to select one of the object scores included within the common instance output 304A and the rare instance output 304B to represent as the overall object score computed for the input image 302. For example, if the rarity score fails to satisfy the predetermined threshold, the system selects the object scores included within the common instance output 304A as the overall object scores, i.e., does not modify the object scores in the common instance output 304A. Alternatively, if the rarity score satisfies the predetermined threshold, the system instead selects the object scores included within the rare instance output 304B as the overall object scores, i.e., does not use the object scores in the common instance output 304A.

In some other implementations, instead of selecting one of the object scores, the system may instead combine the respective object scores to compute a new overall object score. For example, in response to determining that the rarity score satisfies the predetermined threshold, the system can compute an average value of the respective object scores. In some other examples, the system can compute a weighted average based upon the difference between the rarity score value and the value of the predetermined threshold.

Alternatively, the system may adjust the value of the object score by predetermined amounts based on the value of the rarity score falling within a corresponding range of values. The range of values can include "HIGH," "MEDIUM," and "LOW" ranges representing a rareness of the detected objects based on the lower-bound and higher-bound values for the rarity score. For example, a first object score for a first detected object with a first rarity score that falls within the "HIGH" range can be adjusted to a greater degree than a second object score for a detected object with a rarity score that falls within the "LOW" range. In this example, the first object score is adjusted to a greater degree than the second object score because the first detected object is identified as a rarely occurring object whereas the second detected object is identified as a commonly occurring object.

The system classifies the input image in accordance with the determined weight (250). The system classifies the detected object of the input image 302 as corresponding to one or more object categories based on the object scores computed using the determined weight. For example, the system classifies an object that is identified as commonly occurring object as belonging to an object category, but prevents the classification of an object that is identified as a rarely occurring object. In this example, a value of the object score, determined using the rarity score for the objects, is used to classify an object that has an object score that satisfies a threshold (e.g., commonly occurring objects) and prevent classification of another object that has an object score that does not satisfy a threshold (e.g., rarely occurring objects). In other examples, instead of preventing the classification of the object, the system can either perform classification using a rare instance classifier or classify the object as a miscellaneous category that is not associated with other object categories. In this regard, the system uses the operation 200 to reduce the likelihood of repeated incorrect classification of objects that are identified as rarely occurring objects.

Referring now to FIG. 3A, a schematic diagram of an example of the architecture 300A that includes the common instance classifier 310 and the rare instance classifier 320 is depicted. Briefly, the common instance classifier 310 receives an input image 302 that includes a detected object 302A. The common instance classifier 310 processes the input image 302 to generate a common instance output 304A, which includes an object score 305. The rare instance classifier 312 receives and processes the input image 302 in parallel with the common instance classifier 310 to generate a rare instance neural output 304B, which includes an object score 306 and a rarity score 308.

The common instance classifier 310 and the rare instance classifier 320 can generally represent software modules that are implemented within the on-board classifier subsystem 134 as described above and depicted in FIG. 1. The common instance and rare instance classifiers 310 and 320 can be logically separated on a single hardware module of the on-board classifier subsystem 134, or alternatively, implemented on separate hardware modules of the on-board classifier subsystem 134. The input image 302 can be collected by the sensor subsystem 132. In some implementations, the input image 302 is initially provided as input to an object detection classifier that detects the presence of an object prior to the input image 102 being provided as input to the common and rare instance classifiers 310 and 320.

In some implementations, the common instance and rare instance classifiers 310 and 320 can be neural networks that include appropriate layer architectures to process the input image 302 and classify the input image as having objects belonging to one or more object categories. For example, the common and rare instance classifiers 310 and 320 can be convolutional neural networks that are trained to compute object scores that each represent a respectively likelihood that the input image 302 includes an object that belongs to an object category associated with the object score.

In some implementations, the rare instance neural network can have less parameters than the common instance neural network. For example, the common instance neural network can be trained to compute multiple object scores for the input image 302 that correspond to multiple object categories, whereas the rare instance neural network can be trained only to compute a single rarity score for the input image 302. In another example, the layers of the rare instance neural network can have less depth and computation relative to the layers of the common instance neural network, e.g., a 50% less depth and a 75% less computation. In addition, in some implementations, the rare instance neural network can exclude average pooling and fully connected layers that can be included in the common instance neural network.

The input image 302 includes a representation of a detected object 302A corresponding to a traffic-related sign that instructs a driver that a bump is nearby along a vehicle path. The input image 302 is provided as input to the common instance classifier 310, which uses image classification techniques to compute the object score 305 for the object category "STOP SIGN." The object score 305, in this example, represents a likelihood, determined by the common instance classifier 310, that the detected object 302A within the input image 302 represents a stop sign.

The input image 302 is additionally provided as input to the rare instance classifier 312, which uses image classification techniques to compute a rarity score 308 for the detected object 302A. The rarity score 308 represents a likelihood, determined by the rare instance classifier 310, that the detected object within the input image 302 is a rarely occurring object such as a location-specific traffic sign, a unique object, or a distorted representation of some other type of object.

The rare instance classifier 312, in the example depicted, additionally computes the object score 306 for the object category "STOP SIGN." The object score 306 represents a likelihood, determined by the rare instance classifier 320, that the detected object 302A within the input image 302 represents a stop sign. Although this example depicts the rare and common classifiers 310 and 320 computing respective object scores for the same object category (e.g., "STOP SIGN"), in other implementations, each classifier may compute object scores for different object categories or groups of object categories. In such implementations, the rare instance classifier 320 can be used as a secondary classifier that determines whether the detected object belongs to an object category that is commonly associated only with rarely occurring objects.

As shown in the example depicted in FIG. 3A, the common instance classifier 310 computes an object score with the value of "0.63," and the rare instance classifier 310 computes an object score and a rarity score with the values of "0.23" and "0.85," respectively. In this example, the value of the object score 305 indicates that the common instance classifier 310 determines a high likelihood that the detected object 302A represents a stop sign. The value of the object score 306, however, indicates that the rare instance classifier 320 determines a low likelihood that the detected object 302A represents a stop sign. Because the rarity score 308 is high, the object score 306 is given less weight during the image classification procedure, reducing the likelihood that the input image 302 is classified as an image that includes an object belonging in the "STOP SIGN" category. The system classifies the detected object 302A based on the contents of the common instance and rare instance outputs 304A and 304B. In the example depicted, although the object score 305 identifies a high likelihood that the detected object 305 is a stop sign, the system nonetheless does not classify the detected object 302A as a stop sign because the rare instance output 304B indicates that the detected object 302A is a rarely occurring object that is unlikely to represent a stop sign. In this example, the rare instance output 304B is therefore used to prevent an incorrect classification of the detected object 302A as a stop sign based on the contents of the common instance output 304A. The rare instance output 304B can therefore be used to reduce a false positive classification based only on using image classification techniques associated with commonly occurring objects. Additionally, or alternatively, the rare instance output 304B can be used to reduce false negative classification by classifying rare occurring objects as belonging to a miscellaneous object category.

In some implementations, the rare instance classifier 320 is selectively activated in certain circumstances as opposed to operating in parallel with the common instance classifier 310 as depicted in FIG. 3A and described above. For example, the rare instance classifier 320 can be activated if the object score 305 fails to satisfy a threshold, which indicates that the detected object 302A may be a rarely occurring object. In this example, the rare instance classifier 320 is a secondary image classification component to verify and/or support the classification results of the common instance classifier 310. In another example, the input image 302 may be initially provided to an object detection classifier that determines whether an object is present within the input image 302. In this example, the rare instance classifier 320 can be selectively activated based upon the detection results of the object detection classifier. For instance, if an object detection score representing a likelihood that the input image 302 includes a detected object fails to satisfy a predetermined threshold, the rare instance classifier 320 can be selectively activated to determine if the input image 302 includes a rarely occurring object.

In some implementations, the rare instance classifier 320 can compute one or more additional rarity scores that represent respective likelihoods that that the input image 302 will be incorrectly classified by the common instance classifier 310. The one or more additional rarity scores can include a score that reflects a likelihood that the input image 302 does not include a rarely occurring object but would otherwise be misclassified by the common instance classifier 310. For example, the score may reflect a high likelihood of misclassification if the input image 302 includes image distortions that distort attributes of an object used for object detection. In another example, the score may reflect a high likelihood of misclassification if the input image 302 does not actually include an object, but includes attributes that are associated with objects.

Figure 3C:
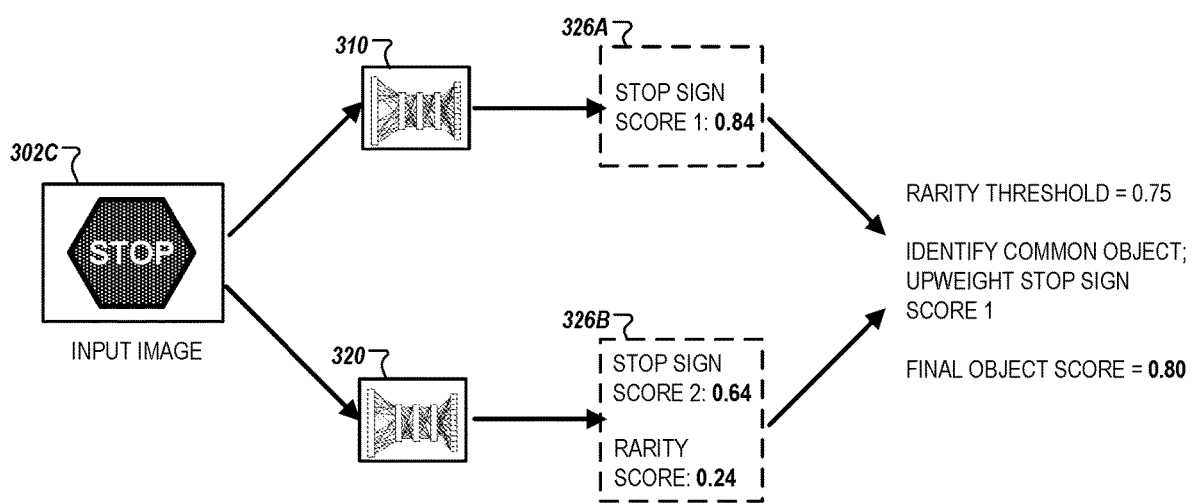
FIG. 3C is a schematic diagram of an example of an architecture where a rare instance classifier identifies a commonly occurring object within an input image.

FIGS. 3B and 3C are schematic diagrams of examples of architectures that use a weighting technique to compute to classify an input image. In these examples, the common instance and rare instance classifiers 310 and 320 each compute an object score for the input image. Each object score represents a likelihood that the input image includes an object that belongs to the "STOP SIGN" object category.

As depicted, the system uses a weighting technique to determine an overall object score for the input image based on a value of a rarity score computed for the detected object. The system uses the value of the rarity score to determine respective weights to apply to each object score and then combines the weighted object scores to compute a final object score that the system uses to classify the input image.

Referring initially to the example depicted in FIG. 3B, the system determines a high likelihood that an input image 302B includes a rarely occurring object based on determining that a rarity score 316B computed by the rare instance classifier 320 exceeds a predetermined rarity threshold of "0.75." In this example, the system down-weights a first object score within a common instance output 316A and up-weights a second object score within a rare instance output 316B in order to compute a final object score that more accurately reflects a likelihood that the input image 302B should be classified as an image that includes an object that belongs to the "STOP SIGN" object category.

Referring now to example depicted in FIG. 3C, the system determines a low likelihood that an input image 302C includes a rarely occurring object based on determining that the rarity score 326B computed by the rare instance classifier 320 does not exceed the predetermined rarity threshold of "0.75." In this example, the system up-weights a first object score within a common instance output 326a and down-weights a second object score within a rare instance output 326B. Thus, in contrast to the exampled depicted in FIG. 3B, the system computes a final object score that indicates a high likelihood that the input image 302B should be classified as an image that includes an object that belongs to the "STOP SIGN" object category.

Although the example depicted provides examples of one type of weighted classification technique that the system applies, in some implementations, the system may use additional or alternative weighting techniques. For example, in some implementations, instead of determining a respective weight that is associated with each object score, the system may instead reduce or increase the value of one or more of the object score based on the value of the rarity score. For example, in certain instances where the rare instance classifier only computes a rarity score, the value of the rarity score relative to a specified threshold can be used to increase or decrease the object score computed by the common instance classifier. In another example, instead of applying respective weights for each object score, the system may adjust the value of one or more of object scores by a predetermined value based on the value of the rarity score. In such examples, the system may increase the value of the object score computed by the common instance classifier 310 if the value of the rarity score is low, increase the value of the object score computed by the rare instance classifier if the value of the rarity score is high, or a combination of both (e.g., simultaneously increasing and/or decreasing the respective object scores based on the value of the rarity score).

FIG. 4 is a schematic diagram of an example of an architecture 400 that includes a combining classifier 330 that processes the outputs of the common instance classifier 310 and the rare instance classifier 320. In this example, the common instance classifier 310 and the rare instance classifier 320 receive and process an input image 402 in a similar manner as described above with respect to FIG. 3A. However, in contrast to the architecture 300A depicted in FIG. 3A, the common instance output 304A and the rare instance output 304B are provided as input to the combining classifier 330.

The combining classifier 330 can be a high precision classifier that has specialized image classification capabilities associated with one or more object categories corresponding to the object scores included within the common and rare instance outputs 304A and 304B. For example, if the combining classifier 330 is associated with a single object category, it classifies the input image 402 as either as an image that includes an object that belongs to the object category, or as an image that does not include an object that belongs to the object category. Alternatively, if the combining classifier 330 is associated with multiple object categories, the combining classifier 330 classifies the input image 402 with respect to each of the multiple object categories.

The combining classifier 330 can also perform the object score adjustments as described above with respect to FIGS. 3A-C.

In some implementations, the combining classifier 330 is capable of differentiating between objects that are identified as rarely occurring objects that do not belong to a particular object category and objects that are identified as rarely occurring objects that do in fact belong to the particular object category. For example, the combining classifier 330 can be trained to differentiate between a rare traffic sign that is not a traffic sign (e.g., the detected object 302A depicted in FIG. 3A) and an object within a distorted image of a traffic sign (e.g., a distorted object of a traffic sign). In this example, the combining classifier 330 can be used to improve the image classification performance of the system by verifying that objects identified by the rare instance classifier 320 as being rarely occurring objects are actually objects that should not belong to a particular object category.

Although a single combining classifier 330 is depicted in FIG. 4, the architecture 400 enables the use of multiple combining classifiers that are each associated with one or more different object categories. In implementations where the common and rare instance classifiers 310 and 320 perform multi-object classification, the common and rare instance outputs 304A and 304B can each be segmented with respect to a single object category. The segmented outputs are then provided as input to respective combining classifiers that are associated with the corresponding object categories. For example, if the common and rare instance outputs 304A and 304B include object scores for a "STOP SIGN" and "VEHICLE" object categories, then the portions of the outputs 304A and 304B that are associated with the object scores for the "STOP SIGN" object category are provided as input to a first combining classifier, and the portions of the outputs 304A and 304B that are associated with the object scores for the "VEHICLE" object category are provided as input to a second combining classifier. In this example, the use of multiple combining classifiers can be used to improve the accuracy of image classification with respect to a specific object category.

Additionally, the functions performed by the common instance, rare instance, and combining classifiers are described in the context of vehicles running an on-board system physically placed in a vehicle, the classifiers can additionally be used as a part of other systems of one or more computers that classify other kinds of images for other purposes. For example, the techniques described throughout may be applicable for monitoring the conditions of a property using the techniques to improve the classification of images captured by a camera that captures security footage of the exterior of the property.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of training a rare instance neural network, the method comprising:
   receiving a plurality of labeled training images;
   identifying a subset of the labeled training images that are likely to be misclassified by a common instance neural network that has been trained on the labeled training images to classify images into object categories, wherein the identifying comprises at least one of:

processing the labeled training images using the trained common instance neural network to identify labeled training images that are misclassified by the common instance neural network, or identifying labeled training images that depict objects of object types that occur rarely in the labeled training images;

generating, from the subset of the labeled training images, training data for a rare instance neural network, the rare instance neural network being configured to process an input image to generate a rarity output that includes a rarity score that represents a likelihood that the input image will be incorrectly classified by the trained common instance neural network; and training the rare instance neural network on the training data to generate rarity scores for the subset of labeled training images that indicate that the subset of labeled training images are likely to be incorrectly classified by the common instance neural network.

2. The method of claim 1, wherein the rare instance neural network has fewer parameters than the common instance neural network.

3. The method of claim 1, wherein generating the training data comprises:

generating transformed images from one or more of the labeled training images.

4. The method of claim 1, wherein training the rare instance neural network further comprises:

training the rare instance neural network to generate, for the subset of labeled training images, rarity scores that satisfy a predetermined threshold.

5. The method of claim 4, wherein training further comprises:

training the rare instance neural network to generate, for labeled training images that are not in the subset of labeled training images, rarity scores that do not satisfy the predetermined threshold.

6. A system comprising:

one or more computers; and one or more storage devices storing instructions that, when executed by the one or more computers, cause the one or more computers to perform operations comprising:

receiving a plurality of labeled training images;

identifying a subset of the labeled training images that are likely to be misclassified by a common instance neural network that has been trained on the labeled training images to classify images into object categories, wherein the identifying comprises at least one of:

processing the labeled training images using the trained common instance neural network to identify labeled training images that are misclassified by the common instance neural network, or identifying labeled training images that depict objects of object types that occur rarely in the labeled training images;

generating, from the subset of the labeled training images, training data for a rare instance neural network, the rare instance neural network being configured to process an input image to generate a rarity output that includes a rarity score that represents a likelihood that the input image will be incorrectly classified by the trained common instance neural network; and training the rare instance neural network on the training data to generate rarity scores for the subset of labeled training images that indicate that the subset of labeled training images are likely to be incorrectly classified by the common instance neural network.

7. The system of claim 6, wherein the rare instance neural network has fewer parameters than the common instance neural network.

8. The system of claim 6, wherein generating the training data comprises:

generating transformed images from one or more of the labeled training images.

9. The system of claim 6, wherein training the rare instance neural network further comprises:

training the rare instance neural network to generate, for the subset of labeled training images, rarity scores that satisfy a predetermined threshold.

10. The system of claim 9, wherein training further comprises:

training the rare instance neural network to generate, for labeled training images that are not in the subset of labeled training images, rarity scores that do not satisfy the predetermined threshold.

11. A non-transitory computer-readable storage device encoded with computer program instructions that, when executed by one or more computers, cause the one or more computers to perform operations comprising:

receiving a plurality of labeled training images;

identifying a subset of the labeled training images that are likely to be misclassified by a common instance neural network that has been trained on the labeled training images to classify images into object categories, wherein the identifying comprises at least one of:

processing the labeled training images using the trained common instance neural network to identify labeled training images that are misclassified by the common instance neural network, or identifying labeled training images that depict objects of object types that occur rarely in the labeled training images;

generating, from the subset of the labeled training images, training data for a rare instance neural network, the rare instance neural network being configured to process an input image to generate a rarity output that includes a rarity score that represents a likelihood that the input image will be incorrectly classified by the trained common instance neural network; and training the rare instance neural network on the training data to generate rarity scores for the subset of labeled training images that indicate that the subset of labeled training images are likely to be incorrectly classified by the common instance neural network.

12. The device of claim 11, wherein the rare instance neural network has fewer parameters than the common instance neural network.

13. The device of claim 11, wherein generating the training data comprises:

generating transformed images from one or more of the labeled training images.

14. The device of claim 11, wherein training the rare instance neural network further comprises:

training the rare instance neural network to generate, for the subset of labeled training images, rarity scores that satisfy a predetermined threshold.

* * * * *